UNITED STATES PATENT OFFICE.

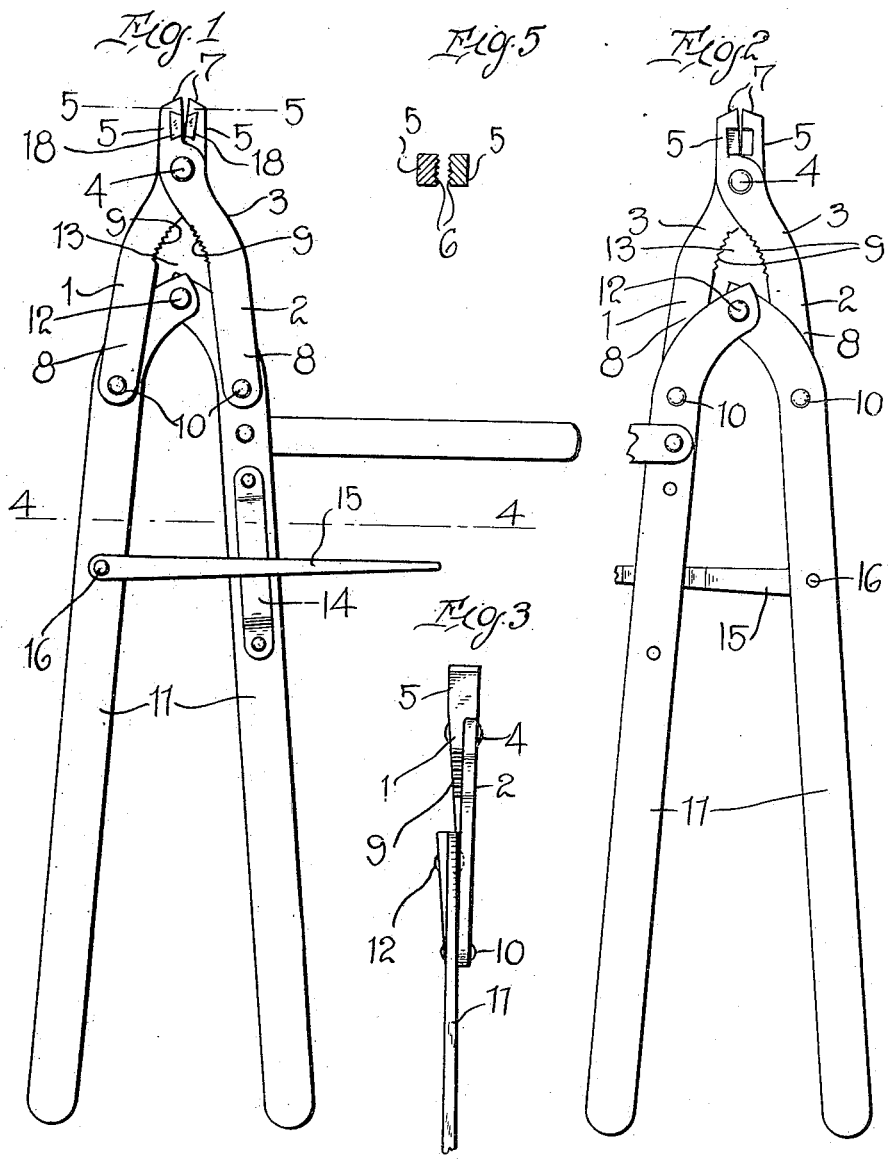

CLARENCE BRICKEY, OF MORRILLTON, ARKANSAS.

BOLT-HOLDER.

1,125,454.   Specification of Letters Patent.   Patented Jan. 19, 1915.

Application filed June 3, 1914. Serial No. 842,741.

*To all whom it may concern:*

Be it known that I, CLARENCE BRICKEY, a citizen of the United States, residing at Morrillton, in the county of Conway and State of Arkansas, have invented certain new and useful Improvements in Bolt-Holders, of which the following is a specification, reference being had to the accompanying drawings.

This invention relates to bolt holders, and particularly to a tool for use in connection with what are known in the art as flat headed bolts and it has for its object the provision of a pair of main gripping members and a pair of actuating members connected with the gripping members in such manner that will maximize the gripping action of the members on the minimum application of power to the actuating members.

Another object of the invention is the provision of a tool of this character which will operate in a positive manner against the bolt so as to hold the same against turning during the operation of respectively moving the nut onto and off of the threaded end of the bolt.

Another object of the invention is the provision of a tool of this character which will consist of pivoted gripping members and manually operable actuating members and the connection of the former with the latter in a manner which will permit the tool to be effectually used as a pipe holder or wrench.

Another object of the invention resides in the construction of the gripping members whereby on the initial application of force thereto, the effective gripping ends of the members will be made to slightly penetrate the material of the object in which the bolt is connected to thereby insure the members being properly advanced into proper gripping connection with the head of the bolt.

With these and other objects in view, the invention consists of certain novel features of construction, combination and arrangement of parts, as will be hereinafter described and claimed.

In the accompanying drawings:—Figure 1 is a side view of the tool; Fig. 2 is a similar view looking at the opposite side thereof; Fig. 3 is an edge view; Fig. 4 is a section taken on the line 4—4 of Fig. 1; and Fig. 5 is a section, taken on the line 5—5 of Fig. 1.

The device is shown to consist of two gripping members, 1 and 2, which are provided with relatively offset intermediate portions 3 having pivotal connection with each other at 4, and beyond the portions 3 the members are provided with gripping heads 5 having inner series of teeth 6, and as illustrated these heads are provided with obtuse angular surfaces 7 for a purpose to be hereinafter referred to. The said members are provided with relatively long arms 8 disposed in diverging relation and provided along their inner edges with pipe gripping surfaces or teeth 9.

The members 8, 8 are pivotally connected at their inner ends, as at 10, to main actuating members 11, 11 and on reference to Fig. 1, it is seen that these members are extended to points between the arms 8, 8 and they are then pivotally connected with each other, as at 12. This arrangement is such that a pipe receiving opening 13 is defined by the arms 8, 8 and the adjacent surfaces of the members 11, 11, and when the said members 11, 11 are moved toward each other the toothed surfaces 9 of the arms 8 will be drawn into effective gripping engagement with the pipe or object to be held. The construction is also such that the extremities 13 of the members 11, 11 may also be brought into engagement with the pipe to thus increase the gripping action of the device thereagainst.

One of the members 11 is provided along one side with a riveted keeper 14, which is adapted to have interchangeable engagement with the teeth on a relatively springy locking bar 15. This bar has pivotal connection at 16 with the opposite member 11 and is adapted to hold both members 11 against moving away from each other when the gripping members of the tool are brought into gripping engagement with the object to be manipulated. The bar 15 may be swung down against one side of the member 11 to which it is connected, so that the tool may be folded to occupy a comparatively small space in shipment or storage.

When using the device for the purpose of holding the bolt, the members 11, 11 are open so as to permit the head of the bolt to be properly accommodated in the space between the heads 5 and pressure is then exerted upon the tool so as to cause the points 16 of the heads to penetrate the object with which the bolt is connected. The members 11, 11 are then moved toward each other causing the teeth 6 to thoroughly grip the head of the bolt and thereby permit the latter to be held stationary during the operation of adjusting the nut onto or off of the bolt as the occasion may demand.

When using the device as a pipe holder, the members 11, 11 are also moved apart so as to permit the pipe to be freely passed into the space between the arms 8, 8 and the members 11, 11 are then adjusted toward each other so as to advance the gripping surfaces 9 into positive gripping engagement with the pipe.

Small cutting plates 18 are secured to the sides of the heads 5 and they are employed for the purpose of cutting the bolt much in the manner of a pair of pliers or the like.

One of the members 11 is provided with a small pivoted handle which normally lies in a flat position against one side of said member, and as illustrated, this handle may be adjusted to lie at an angle to the member 11. It may be held by the hand to prevent the tool from turning when the nut is being manipulated.

What is claimed is:

1. A tool of the class described including a pair of gripping members having opposed portions of their inner faces provided with serrations and adapted to receive an object therebetween, a pair of actuating members, pivotally connected with the gripping members, the outer ends of the actuating members extending between the gripping members, said ends being pivotally connected so that they will coact with the serrated portions of the gripping members and bear against the object to afford additional gripping means, and means carried by the actuating members to retain the same in operative position.

2. A tool of the class described including a pair of gripping members having opposed portions of their inner faces provided with serrations and adapted to receive an object therebetween, a pair of actuating members pivotally connecting with the gripping members, the outer ends of the actuating members extending between the gripping members, said ends being pivotally connected so that they will coact with the serrated portions of the gripping members and bear against the object to afford additional gripping means, a keeper carried by one of the actuating members, and a locking bar carried by the remaining actuating member provided with serrations adapted to engage the keeper to retain the actuating members in operative position.

In testimony whereof I hereunto affix my signature in the presence of two witnesses.

CLARENCE BRICKEY.

Witnesses:
O. T. BENTLEY,
W. L. PRESLEY.

Copies of this patent may be obtained for five cents each, by addressing the "Commissioner of Patents, Washington, D. C."